United States Patent [19]
Miller et al.

[11] Patent Number: 6,089,037
[45] Date of Patent: Jul. 18, 2000

[54] AIR HEADER STRUCTURAL SYSTEM FOR AUGER TYPE POULTRY CHILLER

[75] Inventors: Michael E. Miller, London; Andrew C. Estes, Russellville, both of Ark.

[73] Assignee: Cooling & Applied Technology, Inc., Russellville, Ark.

[21] Appl. No.: 09/298,364

[22] Filed: Apr. 23, 1999

[51] Int. Cl.[7] .................................................. F25D 17/02
[52] U.S. Cl. .............................................. 62/314; 62/374
[58] Field of Search ................................ 62/63, 64, 306, 62/314, 374, 381

[56] References Cited

U.S. PATENT DOCUMENTS

| | | |
|---|---|---|
| 4,788,831 | 12/1988 | Crawford et al. . |
| 4,827,727 | 5/1989 | Caracciolo . |
| 4,849,237 | 7/1989 | Hurst . |
| 4,860,554 | 8/1989 | Innes et al. . |
| 5,390,900 | 2/1995 | Ginzburg ..................................... 62/63 |
| 5,484,615 | 1/1996 | Kounev . |
| 5,562,010 | 10/1996 | McGuire . |
| 5,857,350 | 1/1999 | Johnson et al. ............................ 62/314 |
| 5,868,000 | 2/1999 | Morris et al. . |

Primary Examiner—William E. Tapolcai
Attorney, Agent, or Firm—Ray R. Cox, Jr.

[57] ABSTRACT

A structural system for an auger type poultry chiller in which the air header and structural system are integrated together. A hollow box beam on the longitudinal upper edge of the housing of the chiller provides structural strength and rigidity to the housing. The box beam is airtight and the box beam is connected to a source of pressurized air so that the box beam also serves as an air header. Air hoses connect a series of connectors along the length of the box beam to inlets on the bottom of the chiller housing to introduce pressurized air to the chilled water to prevent clumping of the chilled poultry carcasses. The strength of the box beam air header allows the supports for the auger to be mounted directly to the top of the box beam. In order to provide mounting connections without sacrificing the airtight integrity of the box beam, one or more tubes are run vertically through the box beam at points of attachment for the auger support structure. Bolts run through the tubes fasten the auger supports to the box beam. Desirably, the tubes are slightly oversized so as to allow some adjustment in the longitudinal and transverse placement of the auger support. Furthermore, the location of the auger support on the top of the box beam allows the vertical placement of the auger support to be adjusted by the placement of shims between the auger support and the top of the box beam.

4 Claims, 10 Drawing Sheets

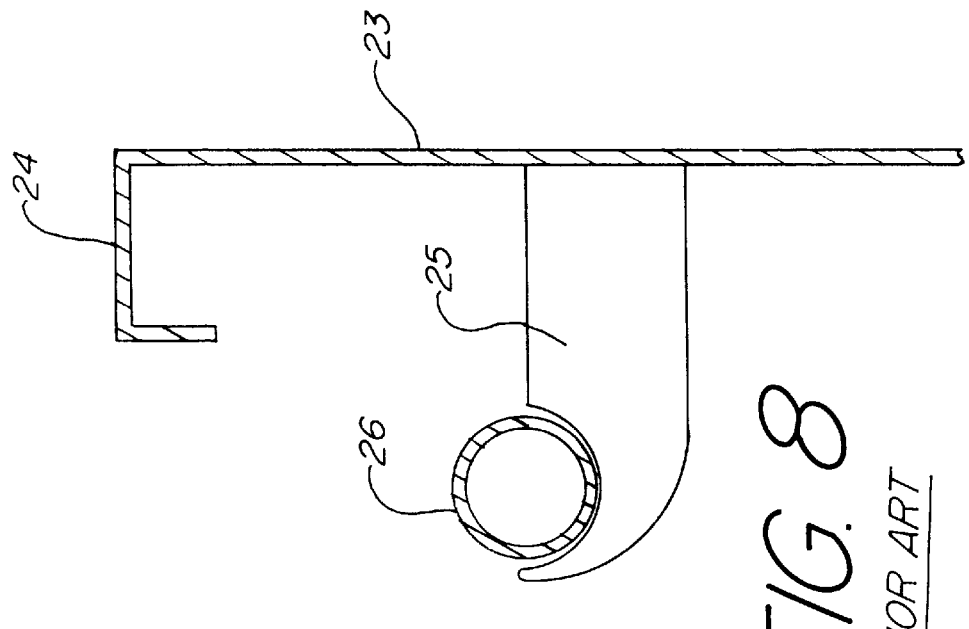
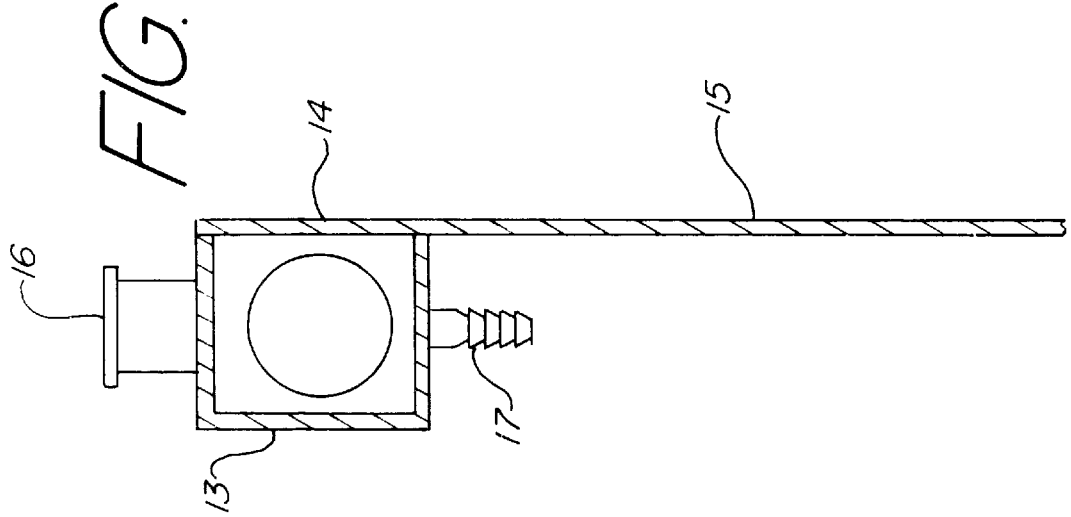

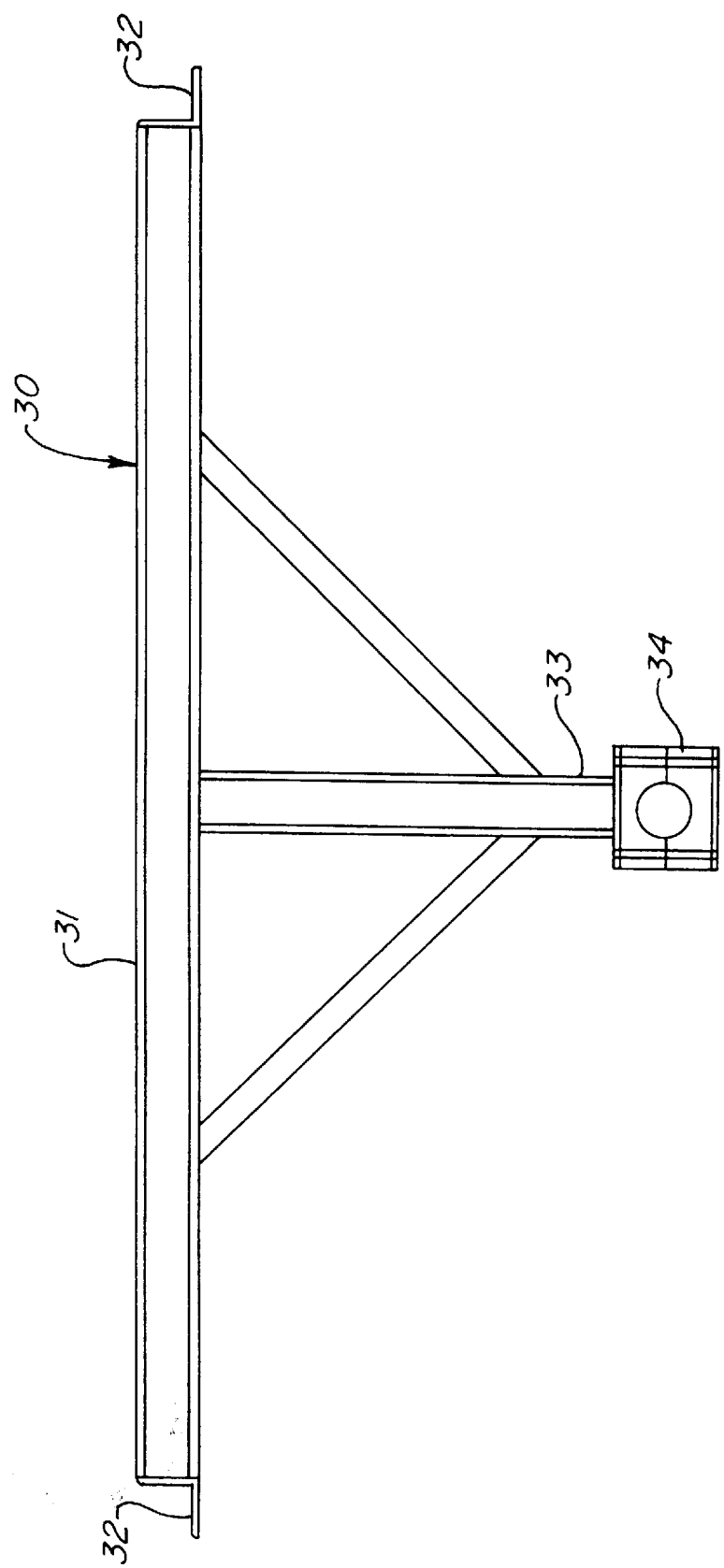

AIR HEADER STRUCTURAL SYSTEM FOR AUGER TYPE POULTRY CHILLER

BACKGROUND OF THE INVENTION

The present invention relates to auger type poultry chillers using a chilled water bath to chill poultry carcasses, and in particular, to the type of poultry chiller having means to introduce pressurized air into the chiller to agitate the chilled water bath.

In the processing of poultry for human consumption, it is necessary that the slaughtered, eviscerated poultry carcasses be chilled as rapidly as possible. Various types of poultry chillers to accomplish the chilling of freshly killed poultry are known in the art. Poultry chillers typically employ chilled water to reduce the temperature of the poultry carcasses. For example, U.S. Pat. No. 4,788,831 discloses a drag type chiller in which a series of moving rakes advance the poultry carcasses through a tank of chilling liquid.

Another type of chiller is the auger type as disclosed in U.S. Pat. No. 5,868,000 which discloses a poultry chiller in which an auger having a series of flights that form a generally helical structure that when rotated moves the poultry carcasses through a chilled water bath. Similar chillers are disclosed in U.S. Pat. Nos. 4,860,554 and 5,484,615.

In the auger type chiller, the auger rotates within a trough shaped housing. The poultry carcasses enter at one end of the housing and are removed at the opposite end of the housing. Water is chilled externally, for example, by an ammonia refrigeration system through a heat exchanger. The chilled water enters the chiller housing at the end from which the chilled poultry carcasses are removed, and the water circulates in the opposite direction to the movement of the poultry carcasses, exiting the chiller, after being warmed by contact with the poultry carcasses, at the end where the carcasses are introduced. The warmed water is again chilled by the refrigeration system and recirculated through the chiller.

As noted in U.S. Pat. No. 5,868,000, one problem with the auger type chiller is the tendency of the poultry carcasses to clump or bunch up between successive flights of the helical auger. The solution disclosed in this patent is to provide the auger with a set of structures, which break up the clumps and distribute the poultry carcasses more evenly between the flights of the auger. Another solution to this problem that has been adopted in the art is to provide jets of compressed air which are introduced into the bottom of the chiller. The pressurized air agitates the chilled water and prevents clumping of the poultry carcasses. In order to supply the pressurized air to the chiller, it is typical to provide an air header which is mounted longitudinally outboard of the upper edge of the housing of the chiller. The air header is provided with a supply of pressurized air. From the air header, a series of air hoses are led to inlets on the bottom of the chiller housing.

Various other means of introducing pressurized air or other fluids into the bottom of a chiller housing are known in the art. Examples are particularly common from the art of sterilizing or decontaminating chiller water and the poultry carcasses therein. Examples include U.S. Pat. Nos. 4,827, 727; 4,849,237; and 5,484,615.

While there are advantages to locating the air header at the upper edge of the chiller housing, there are severe disadvantages which generally fall into two groups. First, the location of the air header longitudinally outboard of the upper edge of the housing places the air header into a space which is generally used for access to the equipment. For example, it may be necessary to construction an elevated catwalk so that personnel have access to the chiller for observation and maintenance. Such an exposed location however both interferes with access to the chiller and places the air header in a location where it is exposed to damage from personnel and equipment moving along the elevated catwalk. The points of connection of the air hoses to the air header are particularly vulnerable and may easily be broken.

A second major problem with the placement of an air header outboard of the upper edge of the chiller housing is structural. Poultry chillers, while quite heavy constructions, are normally built with limited structural stiffening. The upper edge, for example, is typically formed by bending the sides of the housing into an inverted U-shape with a flattened top surface. Such an arrangement provides a minimum of structural strength to the housing and is adequate for most purposes if the chiller is stationary and if the upper edge of the housing is required to support little more that its own weight. Such an arrangement is completely inadequate, however, if the housing is required to provide the strength and rigidity to support other structures. One such structure is the support structure for the auger itself. As may be understood the auger is a large unwieldy structure which must be adequately supported, at least at each end, for rotary motion. The supporting structure must also assist in resisting the thrust load engendered by the motion of the auger through the chilled water and poultry carcasses. For proper alignment and proper support it is desirable that the support structure for the auger be located above and rest upon the housing itself. The support structure for the augers must also be capable of adjustment to place the auger in the proper position within the housing and with its shaft properly aligned with its motor and bearings.

The limitations of the prior art are overcome by the present invention as described below.

SUMMARY OF THE INVENTION

The present invention is a structural system for an auger type poultry chiller in which the air header and structural system are integrated together. A hollow box beam is provided on the longitudinal upper edge of the housing of the chiller. The hollow box beam provides superior structural strength and rigidity to the housing. Furthermore, the box beam is constructed so as to be airtight. Means are provided to connect the box beam to a source of pressurized air so that the box beam also serves as an air header. A series of connectors along the length of the box beam provide means for leading air hoses to inlets on the bottom of the chiller housing. The connectors are desirably located on the bottom of the box beam so that that they are protection from inadvertent damage.

The strength of the box beam air header allows the supports for the auger to be mounted directly to the top of the box beam. In order to provide mounting connections without sacrificing the airtight integrity of the box beam, one or more tubes are run vertically through the box beam at points of attachment for the auger support structure. The tubes are sealed to the box beam so as to preserve the airtight integrity of the box beam. Bolts run through the tubes provide the means to fasten the auger supports to the box beam. Desirably, the tubes are slightly oversized so as to allow some adjustment in the longitudinal and transverse placement of the auger support. Furthermore, the location of the auger support on the top of the box beam allows the vertical placement of the auger support to be adjusted by the placement of shims between the auger support and the top of the box beam. This is highly desirable in order to finely adjust the auger support so that the auger runs properly on its bearings without twisting and without rubbing against the sides of the housing. Furthermore, such vertical placement on shims allows a gap to be maintained between the auger support and the top of the box beam which facilitates cleaning between the auger support and the box beam, a capability that is highly desirable in food processing applications and avoids the necessity to disassemble the support in order to clean it.

It is therefore an object of the present invention to provide for a combined structural support system and air header for an auger type poultry chiller.

It is a further object of the present invention to provide for a combined structural support system and air header which facilitates the mounting of the auger support and allows for ease of adjustment.

It is also an object of the present invention to provide a combined structural support system and air header which combines economy of construction with enhanced structural integrity, resistance to inadvertent damage and ease of maintenance.

These and other objects and advantages of the present invention will be apparent from a consideration of the following detailed description of the preferred embodiments in conjunction with the appended drawings as described following.

BRIEF DESCRIPTION OF THE DRAWINGS

FIG. 7 is a partial sectional left side elevational view of the air header structural system of the present invention.

FIG. 8 is a partial sectional left side elevational view of the prior art air header.

FIG. 9 is a left side elevational view of an auger bearing support.

DETAILED DESCRIPTION OF THE PREFERRED EMBODIMENTS

The main components of an auger type poultry chiller may be described with respect to FIGS. 1–4. The housing 10 is a generally trough-shaped tank in which the auger 11 rotates on a shaft 12.

Figure 5:
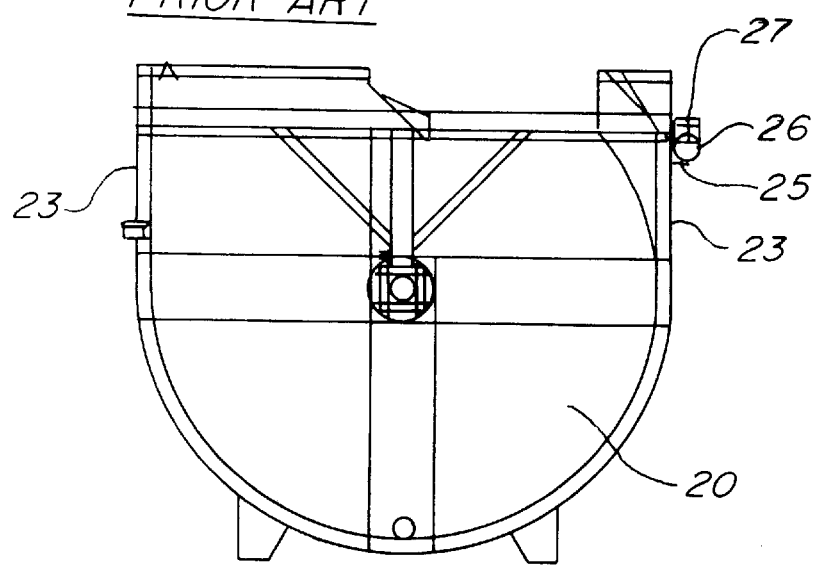
FIG. 5 is a right side elevational view of the prior art auger type poultry chiller.
Figure 6:
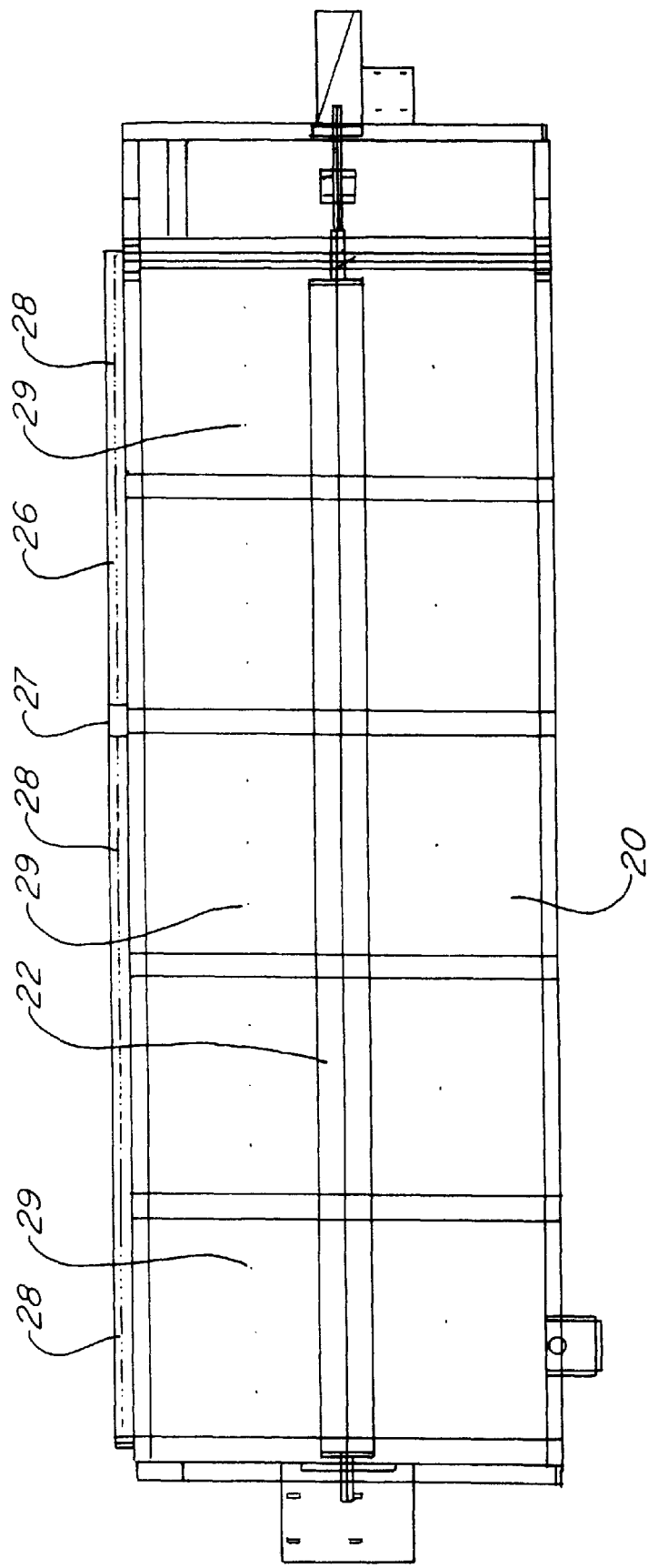
FIG. 6 is a top plan view of the prior art auger type poultry chiller of FIG. 5.
Figure 10:
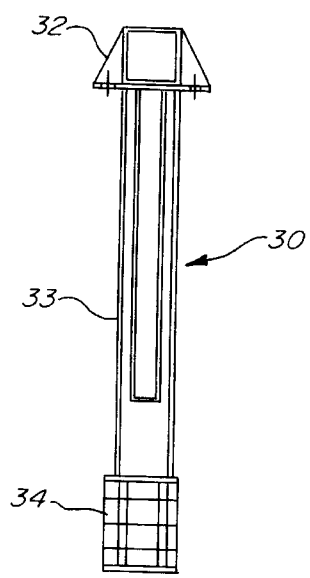
FIG. 10 is a front elevational view of the auger bearing support of FIG. 9.
Figure 11:
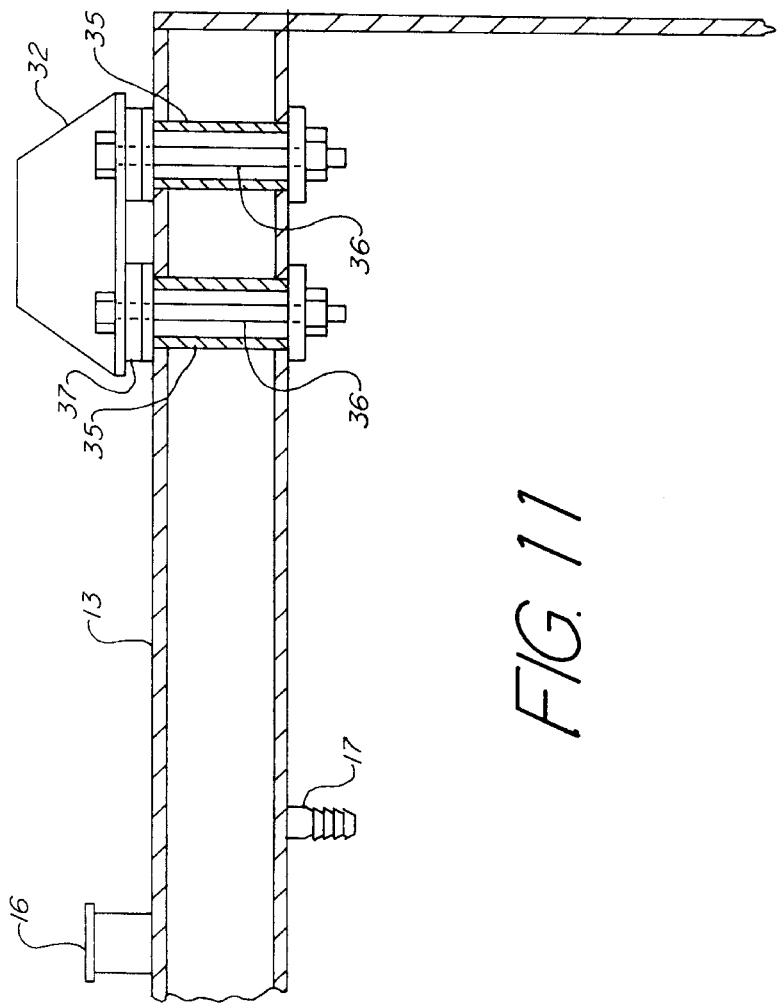
FIG. 11 is a partial sectional elevational view of the air header structural system of the present invention taken along the line A—A of Fig.
Figure 12:
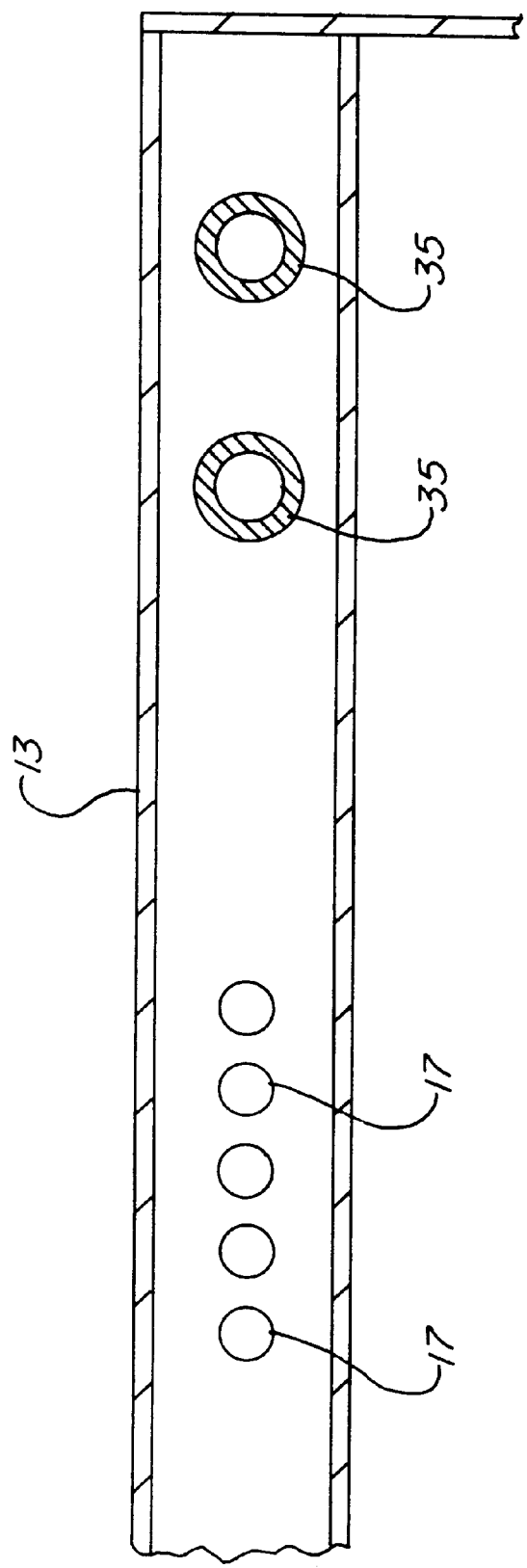
FIG. 12 is a partial sectional top plan view of the air header structural system of FIG. 11 taken along the line B—B of FIG. 3.

In the prior art chiller shown in FIGS. 5, 6, and 8, the same configuration of housing 20, augur (not shown) and rotatable shaft 22 may be found. As shown in FIG. 8, the longitudinal wall 23 of the housing 20 is provided with stiffening reinforcement in the form of an inverted U-shape 24 formed into the upper edge of the longitudinal wall 23. Brackets 25 are affixed to the exterior of the longitudinal wall 23 to support an air header pipe 26. The air header pipe 26 is closed at each end and proved with an air supply coupling 27. A plurality of connectors 28, generally located along the underside of the air header pipe 26 provide points of connect for hoses (not shown) to carry pressurized air to air inlets 29 located along the bottom of the housing 20.

The preferred embodiments of the present invention may be described with reference to FIGS. 1–4 and 7. In the present invention the air header and structural system are integrated together. An air header 13 is formed as a hollow box beam on the longitudinal upper edge 14 of the longitudinal wall 15 of the housing 10 of the chiller. The hollow box beam air header 13 provides superior structural strength and rigidity to the housing 10. The box beam air header 13 is constructed so as to be airtight. A coupling 16 is provided to connect the box beam air header 13 to a source of pressurized air (not shown). A plurality of air connectors 17 along the length of the box beam air header 13 provide means for leading air hoses (not shown) to air inlets 18 on the bottom of the chiller housing 10. The air connectors 17 are desirably located on the bottom of the box beam air header 13 so that that they are protected from inadvertent damage.

Figure 1:
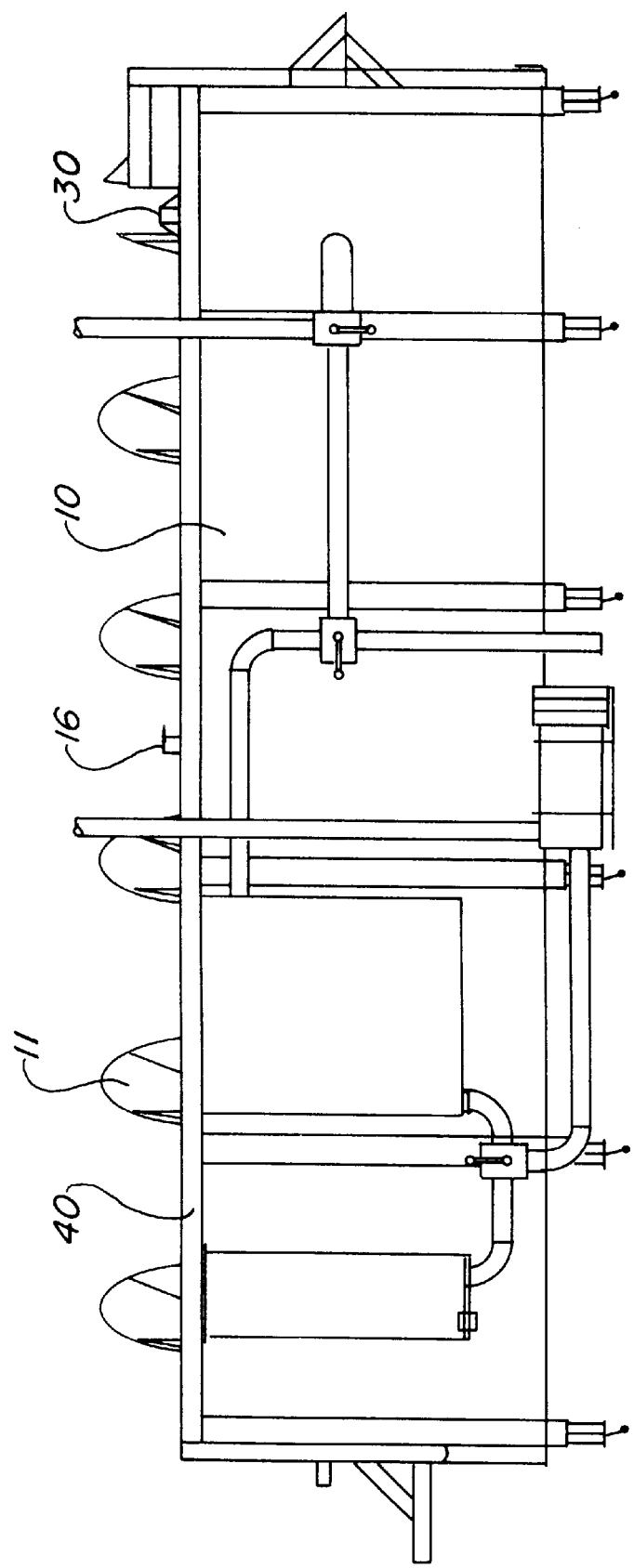
FIG. 1 is a front elevational view of an auger type poultry chiller.
Figure 2:
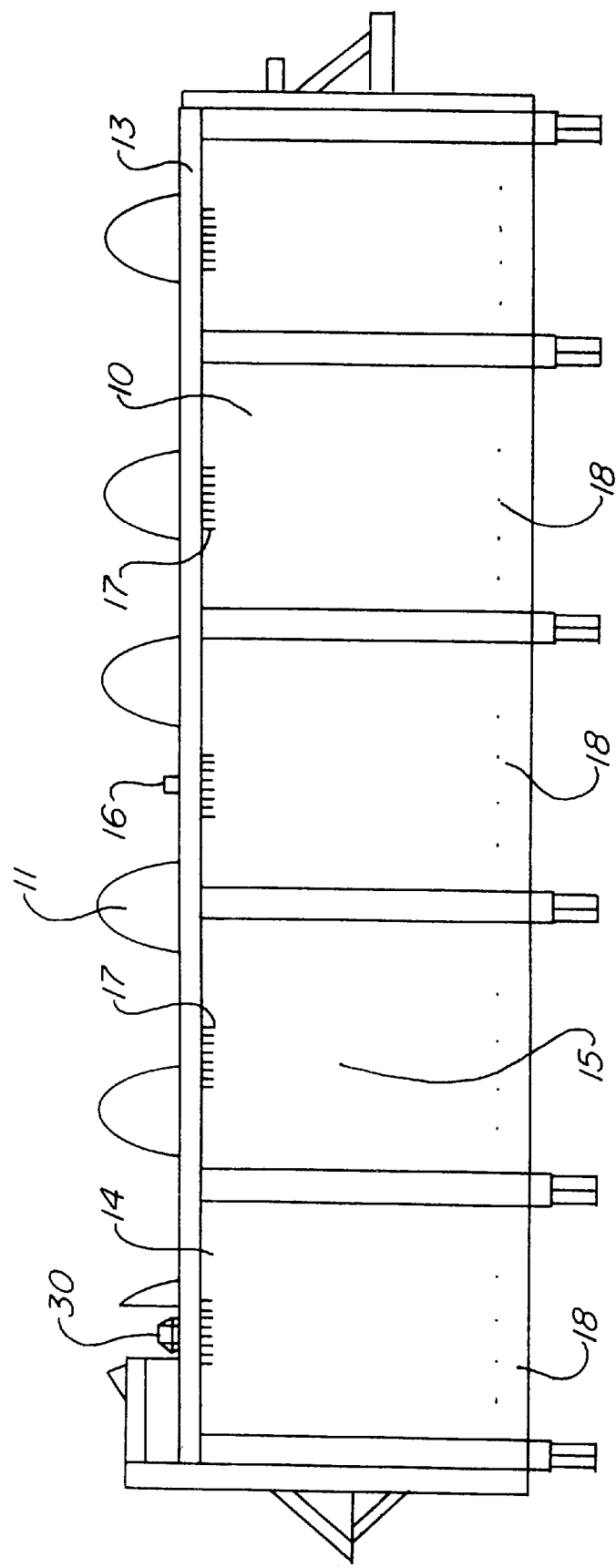
FIG. 2 is a rear elevational view of the auger type poultry chiller of FIG. 1 showing the air header structural system of the present invention.
Figure 3:
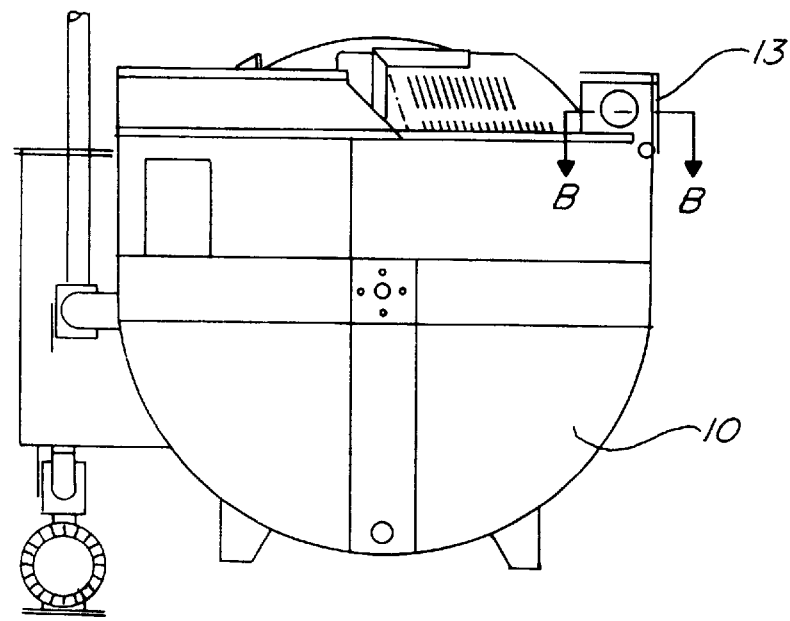
FIG. 3 is a right side elevational view of the auger type poultry chiller of FIG. 1.
Figure 4:
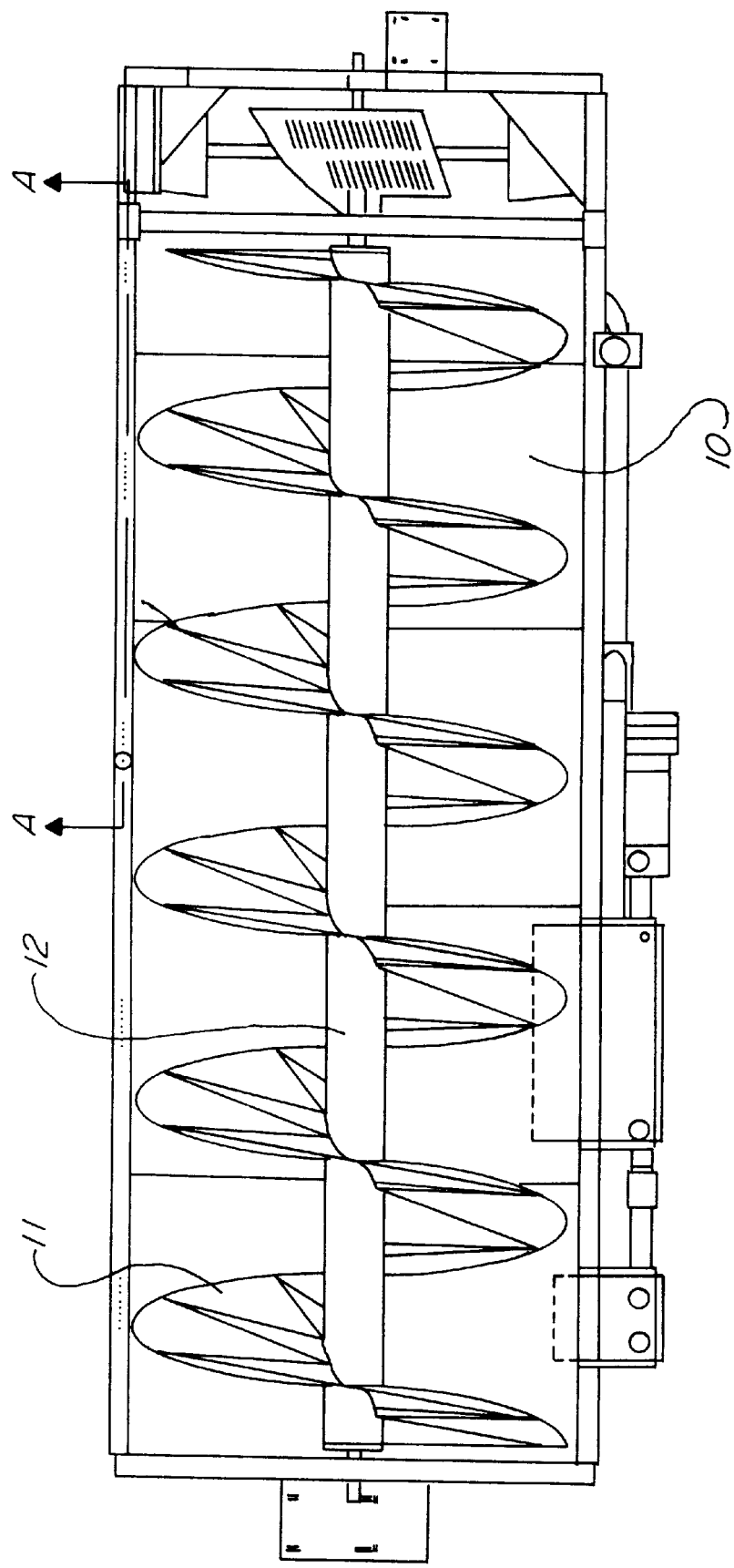
FIG. 4 is a top plan view of the auger type poultry chiller of FIG. 1.

The strength of the box beam air header 13 allows auger bearing support 30 for the auger 11 to be mounted directly to the top of the box beam air header as shown in FIGS. 1, 2, and 4. Only one side of the housing 10 need be provided with a box beam air header 13. The opposite side of the housing 10 is provided with a simple box beam 40.

The method of mounting the auger bearing support 30 to the housing 10 may be described with reference to FIGS. 9–12. The auger bearing support 30 generally comprises a transverse beam 31 which spans the width of the housing 10 between mounting brackets 32 which rest upon the box beam air header 13 and the box beam 40, respectively. A depending beam 33 carries the auger bearing 34 at its bottom end. The end of the auger shaft 12 rotates within the auger bearing 34. An auger bearing support may be located at either end of the auger 11 and at points intermediate to the ends of the auger 11.

In order to provide mounting connections without sacrificing the airtight integrity of the box beam air header 13, one or more tubes 35 are run vertically through the box beam air header 13 at points of attachment for the auger bearing support 30. The mounting brackets 32 are provided with holes through which a bolt 36 may be passed.

The tubes 35 are sealed to the box beam air header 13 so as to preserve the airtight integrity of the box beam air header 13. The bolts 36 run through the tubes 35 provide the means to fasten the auger bearing support 30 to the box beam air header 13. Likewise, the auger bearing support 13 is attached to the box beam 40, although in the case of the box beam 40, airtightness is not required and therefore, the tubes 35 are not needed. The tubes 35 are desirable however to prevent water and debris from entering the box beam 40.

Desirably, the tubes 35 are slightly oversized so as to allow some adjustment in the longitudinal and transverse placement of the auger bearing support 30. Furthermore, the location of the auger bearing support 30 on the top of the box beam allows the vertical placement of the auger bearing support 30 to be adjusted by the placement of shims 37 between the auger bearing support 30 and the top of the box beam air header 13 or the box beam 40. This is highly desirable in order to finely adjust the position of the auger bearing support 30 so that the auger 11 runs properly on its bearings 34 without twisting and without rubbing against the sides of the housing 10. Furthermore, such vertical placement on shims 37 allows a gap to be maintained between the mounting bracket 32 and the top of the box beam air header 13 or box beam 40 which facilitates cleaning between the mounting bracket 32 and the box beam air header 13 or box beam 40, a capability that is highly desirable in food processing applications and avoids the necessity to disassemble the auger bearing support 30 in order to clean it.

The present invention has been described with reference to certain preferred and alternative embodiments that are intended to be exemplary only and not limiting to the full scope of the present invention as set forth in the appended claims.

What is claimed is:

1. A combined structural support system and air header for an auger type poultry chiller having an auger mounted for rotation within a housing, comprising:

an airtight box beam structurally affixed to a longitudinal upper edge of the housing comprising a top, a bottom, two sides, and two ends and having an essentially rectangular cross section;

means for supplying pressurized air to the interior of said box beam; and a plurality of connectors communicating with said interior of said box beam, each of said plurality of connectors operatively connected at a hose; said hose operatively connected to an air inlet on the housing for the delivery of pressurized air to the interior of the housing.

2. The combined structural support system and air header of claim 1 further comprising at least one structural support for the auger; and wherein said box beam further comprises at least one tube affixed vertically through said box beam having an airtight connection to said top of said box beam and having an airtight connection to said bottom of said box beam; and means for removably affixing said auger structural support to said box beam through said tube.

3. The combined structural support system and air header of claim 2 wherein said tube is sized to allow both longitudinal and transverse adjustment in the placement of said auger structural support with respect to said box beam.

4. The combined structural support system and air header of claim 3, further comprising means to vertically adjust the placement of said auger structural support with respect to said top of said box beam.

* * * * *